United States Patent
Garbarino

(10) Patent No.: US 6,751,051 B1
(45) Date of Patent: Jun. 15, 2004

(54) REDUCED ACOUSTICS TREATMENT SPINDLE MOTOR FOR A DISK DRIVE

(75) Inventor: Jonathan M. Garbarino, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 221 days.

(21) Appl. No.: 10/112,414

(22) Filed: Mar. 29, 2002

(51) Int. Cl.$^7$ .......................... G11B 33/08; G11B 17/02
(52) U.S. Cl. ................. 360/99.08; 360/97.02; 310/51; 310/67 R
(58) Field of Search ............................ 360/99.08, 98.07, 360/99.04, 97.02, 97.03, 97.04; 310/51, 67 R

(56) References Cited

U.S. PATENT DOCUMENTS

| | | | |
|---|---|---|---|
| 5,282,100 A | | 1/1994 | Tacklind et al. |
| 5,461,268 A | * | 10/1995 | Sanada ..................... 360/98.07 |
| 5,483,398 A | * | 1/1996 | Boutaghou ............... 360/97.02 |
| 5,781,373 A | | 7/1998 | Larson et al. |
| 5,798,887 A | * | 8/1998 | Yoshida et al. .......... 360/99.08 |
| 5,925,946 A | | 7/1999 | Weingord et al. |
| 5,930,071 A | * | 7/1999 | Back ....................... 360/97.02 |
| 6,256,165 B1 | | 7/2001 | Kim |
| 6,510,021 B1 | * | 1/2003 | Woldemar et al. ....... 360/97.01 |

FOREIGN PATENT DOCUMENTS

EP 0 406 720 A1 * 1/1991

* cited by examiner

*Primary Examiner*—Craig A. Renner
(74) *Attorney, Agent, or Firm*—Milad G. Shara, Esq.; Vierra Magen Marcus Harmon & DeNiro; Ramin Mobarhan, Esq.

(57) ABSTRACT

A spindle motor for a disk drive is disclosed having a carrier assembly supported on a mounting structure by an elastomeric damper for damping and isolating mechanical vibration and noise generated by the spindle motor. The carrier assembly includes a carrier on which is supported the remaining components of the spindle motor such as the hub, bearings, rotor and stator.

17 Claims, 4 Drawing Sheets

REDUCED ACOUSTICS TREATMENT SPINDLE MOTOR FOR A DISK DRIVE

BACKGROUND OF THE INVENTION

1. Field of the Invention

The present invention relates to a spindle motor for a disk drive and in particular to a spindle motor capable of damping and isolating mechanical vibration and noise generated in the spindle motor stator and bearings.

2. Description of the Related Art

There is currently a large demand for disk drives for use in servers, desktop computers and laptops. Disk drive manufacturers are meeting this demand with drives having improved drive performance and higher storage capacities in the same size or smaller form factor. In general, a disk drive includes a head disk assembly (HDA) and control electronics. The HDA consists of an enclosure housing a head stack assembly and one or more magnetic storage disks rotated by a spindle motor. The head stack assembly includes a pivot bearing assembly for pivotally supporting a rotary actuator having one or more read/write heads. As the storage disk is rotated, the read/write head is pivoted across a surface of the storage disk on an air bearing so that information may be transferred to and from the disk under the direction of the control electronics.

One important drive performance characteristic is the level of mechanical vibration emanating from the drive. Large mechanical vibration can adversely affect drive performance. A corollary effect of mechanical vibration is acoustic noise. Acoustic noise emanating from a drive can create the appearance of poor quality. Additionally, standards for acceptable acoustic noise levels, set by the International Standards Organization (ISO), are becoming more stringent as computers become further integrated into the workplace and home.

A significant source of mechanical vibration within a disk drive is the spindle motor. A disk drive spindle motor typically includes a base and a central shaft for securing the spindle motor to the disk drive enclosure. A hub for supporting the storage disks is rotationally mounted to the shaft by a pair of bearings. The spindle motor further includes a rotor fixedly mounted to the hub and a stator fixedly mounted to the shaft, which together generate torque for rotating the hub. In particular, the stator includes a series of electrically conductive coils wrapped around cores which are arranged radially around the shaft. Leading portions of the stator wires extend downwardly from the core and are electrically connected to the drive control electronics. The various coils of the stator are selectively energized, via signals from the printed circuit board assembly, to form an electromagnet that pulls/pushes on a permanent magnet forming part of the rotor. The magnetic interaction between the stator and rotor imparts a rotational motion to the rotor, hub and storage disk(s) attached to the hub.

For brushless spindle motors, the electric current supplied to the coils of the stator is rapidly switched to maintain the stator magnetic field such that the rotor and hub continue to rotate. This switching frequency generates mechanical vibration and noise. The vibration and noise are also compounded by tolerances within the bearings on which the hub and rotor are rotationally supported. This vibration and noise are transmitted through the spindle motor base and shaft to the drive enclosure, which can amplify the vibration and noise, particularly at resonant frequency, due to its large surface area. Moreover, the problem of vibration and noise becomes worse at higher rotational speeds. As drive manufacturers are constantly striving for higher rotational speeds to increase data transfer-rates, the vibratory response of the spindle motor is of critical importance to disk drive manufacturers.

SUMMARY OF THE INVENTION

Embodiments of the present invention relate to a spindle motor for a disk drive, the spindle motor including a mounting structure having a bracket and/or a shaft that mount to the disk drive base and cover, respectively. The motor further includes a carrier assembly including a carrier mounted to the mounting structure. The carrier in turn supports the spindle motor hub, bearings, rotor and stator.

In order to prevent mechanical vibration and noise generated within the motor from being transmitted to the drive enclosure, the carrier assembly is mounted on the mounting structure by an elastomeric damper. In one embodiment, the elastomeric damper may comprise a pair of O-rings interposed at an interface between the mounting structure and the carrier so that no direct contact between the mounting structure and the carrier assembly occurs. As a result, mechanical noise and vibration from the carrier assembly is isolated and not transmitted to the mounting structure or drive enclosure.

In one embodiment, each O-ring lies snugly within an interface between a pair of generally perpendicular surfaces of the mounting structure and a surface of the carrier that is inclined at an oblique angle with respect to the mounting structure surfaces. With such an orientation, the O-rings are able to support the carrier to prevent horizontal and vertical movement of the carrier assembly relative to the mounting structure, and are able to isolate and dampen both horizontal and vertical components of mechanical vibration from the carrier assembly.

BRIEF DESCRIPTION OF THE DRAWINGS

The present invention will now be described with reference to the drawings, in which.

DETAILED DESCRIPTION

Figure 1:
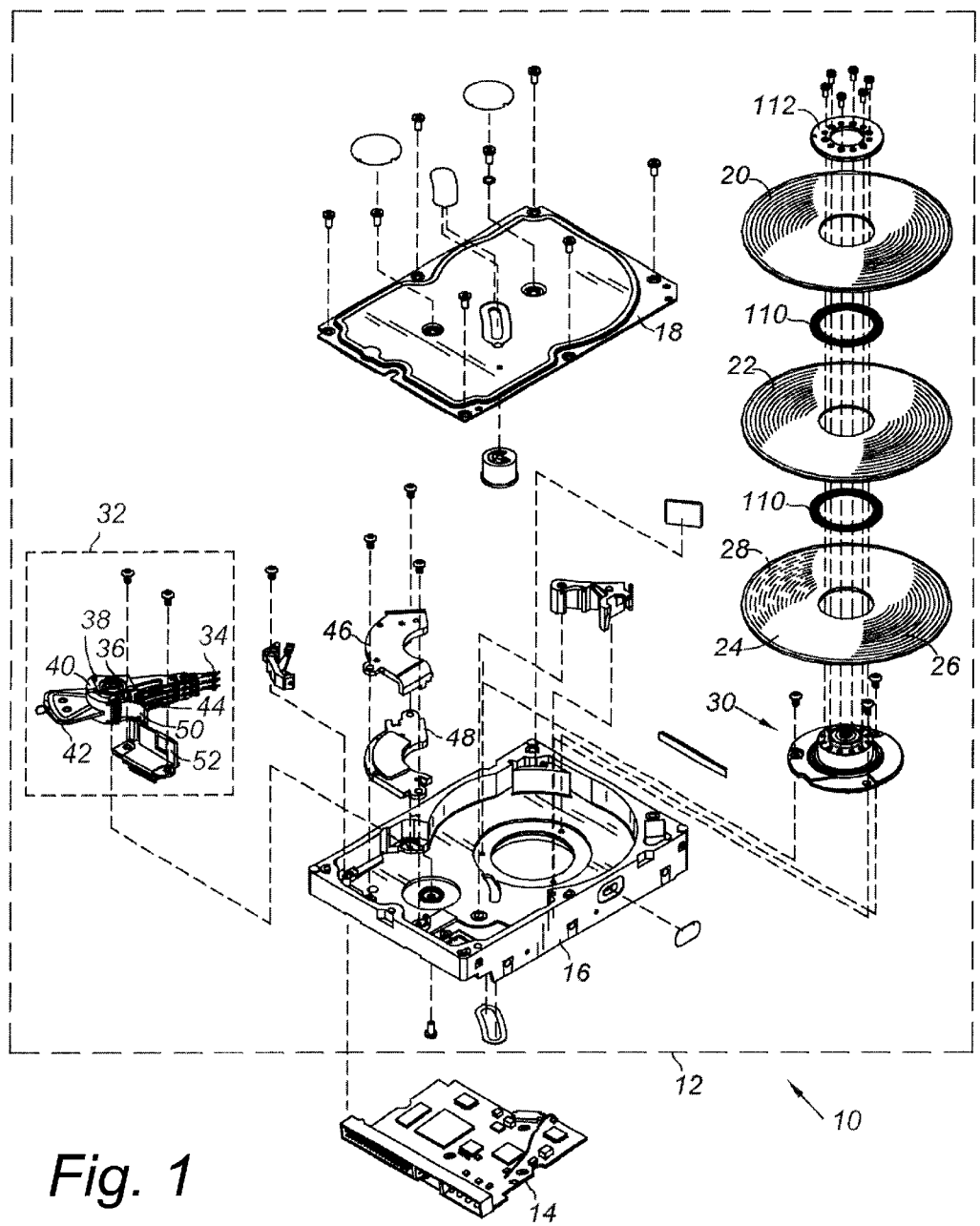
FIG. 1 is an exploded perspective view of a disk drive including a spindle motor according to embodiments of the present invention.

The present invention will now be described more fully with reference to FIGS. 1 through 5, in which preferred embodiments of the invention are shown. The present invention may, however, be embodied in many different forms and should not be construed as being limited to the embodiments set forth herein. FIG. 1 is an exploded perspective view of a disk drive 10 including a head and disk assembly (HDA) 12 and control electronics in the form of printed circuit board (PCB) 14 for controlling operation of the disk drive.

HDA 12 includes a base 16 and a cover 18 affixed to each other to define an enclosure for maintaining a relatively contaminant free environment for the remaining components within the HDA 12. In the embodiment shown in FIG. 1, the HDA 12 further includes magnetic storage disks 20, 22 and 24, each including upper and lower surfaces 26 having concentric data tracks 28 for storing data. Although not critical to the present invention, each storage disk may include, for example, an aluminum or aluminum alloy substrate, a chromium underlayer, a recording layer formed of a ferromagnetic material such as for example CoCrTa, CoPtCr or CoPtNi, and a protective carbon overcoat. It is understood that the number of storage disks is also not critical to the present invention and may include one or more storage disks in alternative embodiments. The one or more storage disks are rotated by a spindle motor 30 explained in greater detail hereinafter.

The HDA 12 further includes a head stack assembly 32 for controllably positioning read/write heads 34 over the storage disk surfaces 26, one head per surface, so that data may be transferred between the heads 34 and data tracks 28. In particular, head stack assembly 32 includes a pivot bearing cartridge 36 mounted to base 16, and a rotary actuator assembly 38 pivotally mounted to the pivot bearing cartridge. The actuator assembly 38 includes a body portion 40, coil portion 42, and actuator arms 44 to which are attached read/write heads 34. Coil portion 42, along with upper magnet plate 46 and lower magnet plate 48 affixed to the cover 18 and base 16, respectively, form a voice coil motor. Current is supplied to the coil portion 42, and data is transferred to and from heads 34, through a flex ribbon 50 which is in turn attached to a header 52 in communication with the PCB 14.

In operation, the PCB 14 supplies a current to the coil portion 42, whereupon electromagnetic forces in the voice coil motor controllably pivot the actuator assembly to position the read/write heads over desired data tracks 28 on the storage disks. Data is then transferred between the read/write heads 34 and data tracks 28 under the control of the PCB 14.

Figure 2:
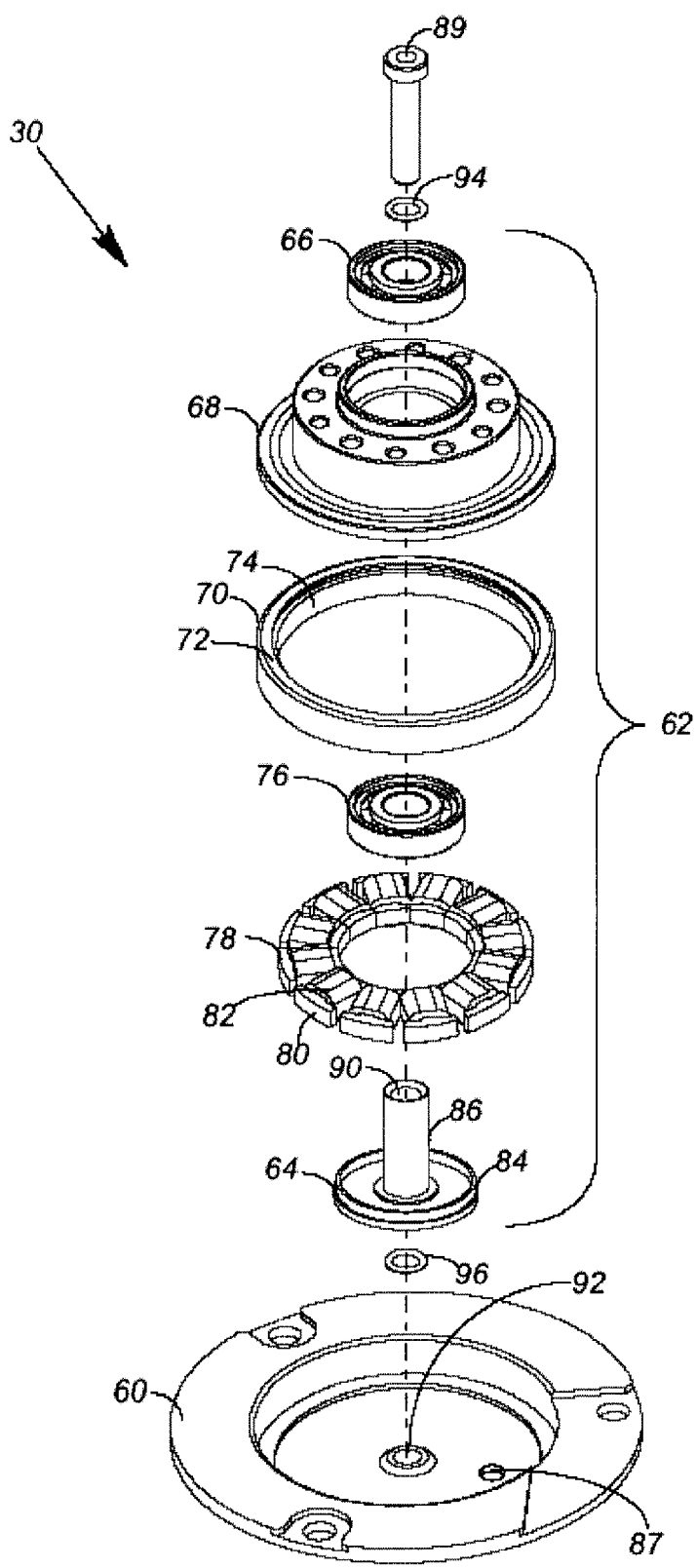
FIG. 2 is an exploded perspective view of a spindle motor according to embodiments of the present invention.
Figure 3:
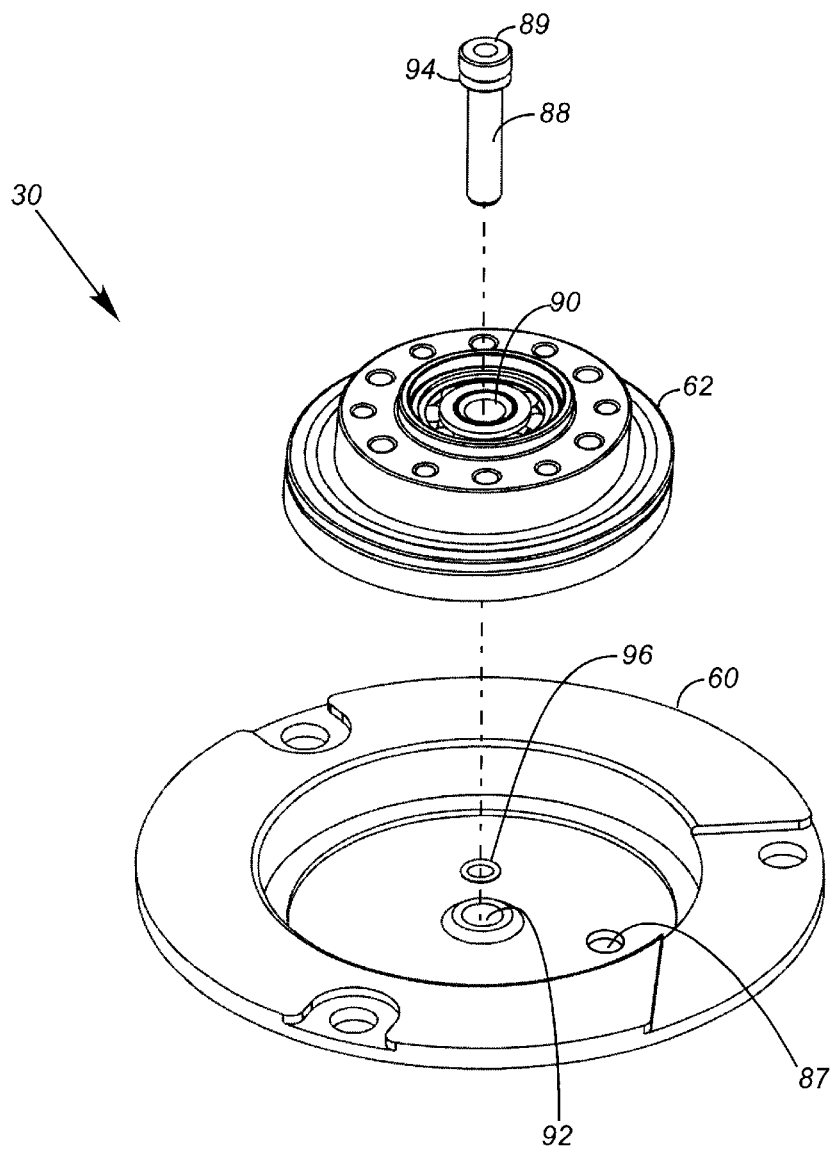
FIG. 3 is a partially exploded perspective view of a spindle motor according to embodiments of the present invention showing the hub, rotor and stator spaced from the bracket and shaft.
Figure 4:
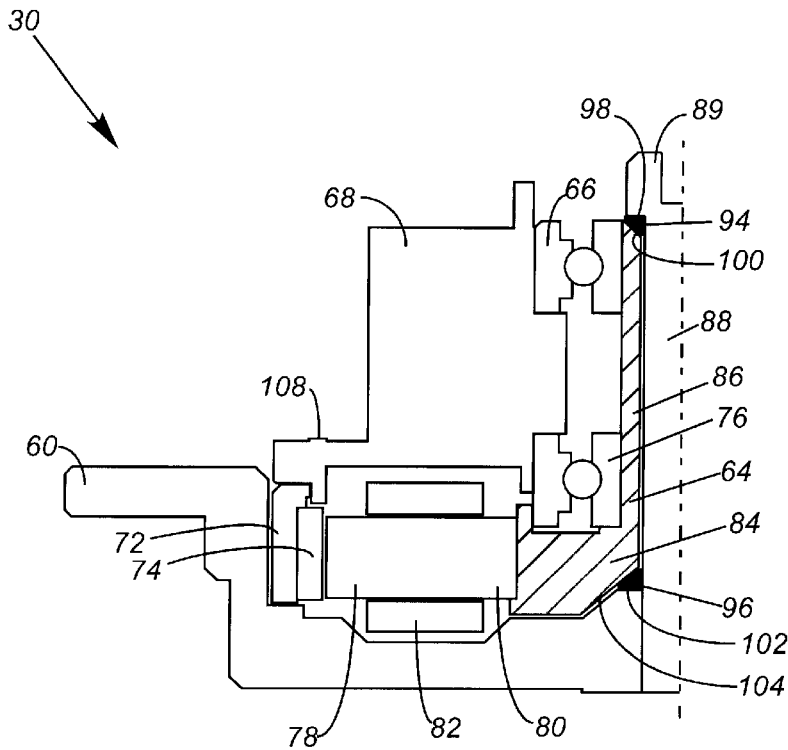
FIG. 4 is a partial cross-sectional side view of a spindle motor according to embodiments of the present invention.

Referring now to FIGS. 2–4 along with FIG. 1, the spindle motor 30 includes an annular bracket 60 mounted to the base 16 by screws or other suitable means. It is contemplated that bracket 60 be formed integrally with the base 16 and not considered part of the spindle motor in alternative embodiments. The bracket 60 supports a carrier assembly 62 (shown exploded in FIG. 2 and assembled in FIG. 3) including a carrier 64, upper bearing 66, a hub 68 and a rotor 70 having a permanent magnet 72 and a back iron 74. The carrier assembly further comprises a lower bearing 76 and a stator 78 including a plurality of cores 80 on which are wound the stator laminations 82.

The carrier 64 supports each of the remaining components of the carrier assembly 62. As best seen in FIGS. 2 and 4, carrier 64 includes a base portion 84 and a cylindrical portion 86 extending therefrom. The upper bearing 66 includes an inner race fixedly mounted around the cylindrical portion 86, and the lower bearing 76 includes an inner race fixedly mounted around the cylindrical portion 86 and press fit into the base portion 84. The bearings 66 and 76 may be mounted to the carrier by known adhesives, such as for example Loctite 6485 manufactured by Loctite Corporation, Cleveland, Ohio 44128, or Threebond 1353 manufactured by ThreeBond International, Inc., Cincinnati, Ohio. The hub 68 is in turn fixed to the outer races of the upper and lower bearings so as to be rotatable with respect to the carrier 64. The back iron 74 and permanent magnet 72 of rotor 70 are affixed to the hub 68 as is known in the art.

The stator 78 is fixedly mounted to the base portion 84 of the carrier 64 (as for example by one of the above-named adhesives) so that the rotor 70 is in close surrounding proximity to the stator 78. Electrical leads (not shown) from the laminations 82 of the stator may be fed through a hole 87 (FIG. 2) in bracket 60 to their termination point on PCB 14.

As best seen in FIG. 3, the carrier assembly 62 may be dropped into the bracket 60 as a preassembled unit. Preassembly of the carrier assembly 62 improves disk drive production yields, in that failures attributable to the carrier assembly components may be reduced. Preassembly also speeds the fabrication process of the disk drive. Once the carrier assembly 62 is seated within bracket 60, a shaft 88 is pushed down through a central opening 90 in the cylindrical portion 86 of the carrier 64 and press fit into a hole 92 in the bracket 60. It is understood that shaft 88 may be fixed within hole 92 by known methods other than by a press fit. It is further understood that the shaft may be pressed through opening 90 in the carrier for insertion into the hole 92 before or after the carrier assembly is seated within the bracket 60. A top 89 of the shaft 88 may include a threaded bore so that a screw (not shown) may be inserted through the cover 18 and into the threaded bore to securely affix the shaft 88 to the drive enclosure.

The spindle motor 30 is affixed to the disk drive by the bracket 60 being mounted to base 16, and the top of shaft 88 being mounted to cover 18. As discussed in the Background of the Invention section, in conventional disk drives, mounting the spindle motor directly to the base and cover resulted in mechanical vibration and noise generated within the spindle motor being transmitted to and amplified by the disk drive enclosure. In order to isolate the spindle motor and dampen vibration transmitted to the drive base and cover, spindle motor 30 further includes an elastomeric damper, for example in the form of O-rings 94 and 96. The damper may be formed of various materials having the desired damping properties, while also exhibiting little or no outgassing. Such materials include nitrile rubber and ethylene propylene diene monomer (EPDM). Other compositions are contemplated.

The elastomeric damper is interposed at one or more interfaces between the mounting structure (comprising the bracket 60 and/or shaft 88) and the carrier assembly 62 so that no direct contact between the mounting structure and carrier assembly occurs. As a result, mechanical noise and vibration from the carrier assembly is isolated and prevented from passing to the mounting structure and drive enclosure.

In one embodiment shown in FIG. 4, the elastomeric damper comprises first O-ring 94 at an interface between the top 89 of shaft 88 and the cylindrical portion 86 of carrier 64. In particular, as seen in FIG. 4, shaft 88 includes a lip 98 at top 89 formed generally perpendicularly to the length of shaft 88. The carrier 64 includes a first inclined surface 100 adjacent to lip 98 and shaft 88, which surface is oblique with respect to both the lip 98 and shaft 88. O-ring 94 fits snugly within the space defined by the interface between shaft 88, lip 98 and inclined surface 100.

O-ring 94 supports the carrier assembly with respect to the mounting structure in both the horizontal and vertical directions (as used herein, "horizontal" and "vertical" are taken with respect to the view of spindle motor 30 shown in FIG. 4). Namely, as a result of the contact of O-ring 94 against the lip 98, O-ring 94 exerts a force axially in the vertical direction against inclined surface 100 and prevents the carrier from moving vertically toward the lip 98. Similarly, as a result of the contact of O-ring 94 against the shaft 88, O-ring 94 exerts a force radially outward in the horizontal direction against inclined surface 100 and prevents horizontal movement of the carrier.

In addition to support, the O-ring 94 further dampens vibration from the carrier assembly in both the horizontal and vertical directions. Namely, the carrier assembly 62 generates mechanical vibration having both horizontal and vertical components. O-ring 94 is able to absorb and dampen both the horizontal and vertical components of the mechanical vibration and prevent them from being transmitted to the mounting structure and drive enclosure.

In addition to O-ring 94, the elastomeric damper of FIG. 4 further comprises a second O-ring 96 at an interface between the shaft 88, the bracket 60 and the base portion 84 of carrier 64. In particular, the bracket 60 includes an annular, horizontal section 102 adjacent to hole 92 into which shaft 88 is fit. The section 102 is generally perpendicular to the length of shaft 88. The carrier 64 includes a second inclined surface 104 adjacent to section 102 and shaft 88, which surface is oblique with respect to both the section 102 and shaft 88. O-ring 96 fits snugly within the space defined by the interface between shaft 88, section 102 and inclined surface 104.

O-ring 96 supports the carrier assembly with respect to the mounting structure in both the horizontal and vertical directions. Namely, as a result of the contact of O-ring 96 against the annular section 102, O-ring 96 exerts a force axially in the vertical direction against inclined surface 104 and prevents the carrier from moving vertically toward bracket 60. Similarly, as a result of the contact of O-ring 96 against the shaft 88, O-ring 96 exerts a force radially outward in the horizontal direction against inclined surface 104 and prevents horizontal movement of the carrier.

The O-ring 96 additionally dampens vibration from the carrier assembly in both the horizontal and vertical directions. As with O-ring 94, O-ring 96 is able to absorb and dampen both the horizontal and vertical components of the mechanical vibration and prevent them from being transmitted to the mounting structure and drive enclosure.

As seen in FIG. 3, the O-ring 94 may be loaded onto shaft 88 prior to insertion of shaft 88 through opening 90 in carrier 64. The shaft may then be passed through opening 90, O-ring 96 and into hole 92 in bracket 60. Upon insertion of the shaft 88 into hole 92, O-ring 94 lodges within the interface between shaft 88, lip 98 and inclined surface 100, and O-ring 96 lodges in the interface between the shaft 88, bracket 60 and base portion 84, as described above. Once the shaft is secured within hole 92, storage disks 20–24 may be positioned on hub 68, supported on a flange 108. The respective disks may be separated by spacers 110 (FIG. 1). Thereafter, a disk clamp 112 may be screwed down onto hub 68 to secure the disks on the spindle motor. The shaft 88 may then be affixed to the cover 18 as described above.

Figure 5:
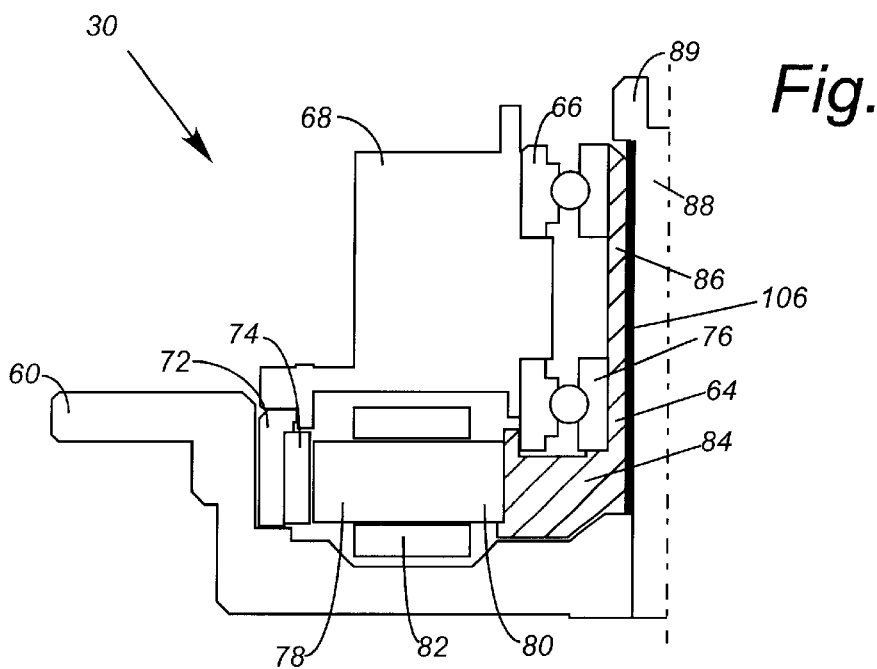
FIG. 5 is a partial cross-sectional side view of a spindle motor according to an alternative embodiment of the present invention.

It is understood that other elastomeric dampers may be used at other interfaces between the mounting structure and carrier assembly and still be within the scope of the invention. For example, in FIG. 5, there is shown a further embodiment where the damper comprises an elastomeric sheath 106 which fits snugly along the interface between shaft 88 and the cylindrical portion 86 of carrier 64. Sheath 106 may be a polymer which is slid over shaft 88. Alternatively, the elastomer may initially be a liquid which is injected into the interface between the mounting structure and the carrier, which liquid then hardens to a material having the damping and isolating properties in accordance with the present invention. Sheath 106 may be used instead of O-rings 94 and 96 as shown in FIG. 5. Alternatively, sheath 106 may be used in addition to O-rings 94 and 96.

Although the invention has been described in detail herein, it should be understood that the invention is not limited to the embodiments herein disclosed. Various changes, substitutions and modifications may be made to the disclosure by those skilled in the art without departing from the spirit or scope of the invention as described and defined by the appended claims.

I claim:

1. A spindle motor for a disk drive, comprising:
    a mounting structure for mounting the spindle motor within the disk drive;
    a carrier assembly, including:
        a carrier for mounting the carrier assembly to the mounting structure, the carrier including a base portion and a cylindrical portion extending from the base portion, the cylindrical portion including an end section distal from the base portion, and a central bore through the end section and cylindrical portion,
        a rotor rotationally mounted to the carrier, and
        a stator fixedly mounted to the carrier; and
    at least one elastomeric damper at an interface between the carrier and the mounting structure for acoustically isolating the carrier assembly from the mounting structure, the mounting structure further comprising an annular bracket adjacent the base portion of the carrier and a shaft extending from the annular bracket and positioned within the central bore.

2. A spindle motor as recited in claim 1, wherein the at least one elastomeric damper comprises a pair of O-rings.

3. A spindle motor as recited in claim 1, wherein the at least one elastomeric damper is formed of at least one of nitrile rubber and ethylene propylene diene monomer.

4. A spindle motor as recited in claim 1, wherein the carrier is formed of stainless steel.

5. A spindle motor as recited in claim 1, the at least one elastomeric damper at the interface between the carrier and the mounting structure comprising a cylindrical sheath within the central bore.

6. A spindle motor as recited in claim 1, the at least one elastomeric damper at the interface between the carrier and the mounting structure comprising a first O-ring between the base portion and an adjacent section of the mounting structure.

7. A spindle motor as recited in claim 6, the at least one elastomeric damper at the interface between the carrier and the mounting structure further comprising a second O-ring between the end section of the cylindrical portion and a section of the mounting structure adjacent to the end section.

8. A disk drive, comprising:
    an enclosure;
    a spindle motor, including:
        a mounting structure for mounting the spindle motor within the disk drive, the mounting structure including a horizontal surface and a vertical surface perpendicular to the horizontal surface,
        a carrier assembly, including:
            a carrier for mounting the carrier assembly to the mounting structure, the carrier including an inclined surface oblique with respect to the horizontal and vertical surfaces,
            a rotor rotationally mounted with respect to the carrier, and
            a stator fixedly mounted to the carrier, and
            a hub rotationally mounted with respect to the carrier; and at least one elastomeric damper at an interface between the inclined surface of the carrier and the horizontal and vertical surfaces of the mounting structure for supporting the carrier against the horizontal and vertical surfaces of the mounting structure and for preventing horizontal and vertical components of mechanical vibration from passing between the carrier and the mounting structure;

at least one magnetic storage disk supported on the hub of the carrier assembly;

at least one transducer for transferring information to and from the at least one magnetic storage disk; and an actuator assembly for positioning the at least one transducer with respect to the at least one magnetic storage disk.

9. A spindle motor as recited in claim 8, wherein the at least one elastomeric damper comprises an O-ring.

10. A spindle motor as recited in claim 8, wherein the at least one elastomeric damper is formed of at least one of nitrile rubber and ethylene propylene diene monomer.

11. A spindle motor for mounting on a mounting structure within a disk drive, comprising:

a carrier assembly, including:
   a carrier for mounting the carrier assembly to the mounting structure, the carrier including a base portion and a cylindrical portion extending from the base portion, the cylindrical portion including an end section distal from the base portion, and a central bore through the end section and cylindrical portion,
   a rotor rotationally mounted to the carrier, and
   a stator fixedly mounted to the carrier; and at least one elastomeric damper for positioning at an interface between the carrier and the mounting structure for acoustically isolating the carrier assembly from the mounting structure, the mounting structure further comprising an annular bracket adjacent the base portion of the carrier and a shaft extending from the annular bracket and positioned within the central bore.

12. A disk drive, comprising:

an enclosure;

a spindle motor, including:
   a mounting structure for mounting the spindle motor within the disk drive,
   a carrier assembly, including:
      a carrier for mounting the carrier assembly to the mounting structure, the carrier including a base portion and a cylindrical portion extending from the base portion, the cylindrical portion including an end section distal from the base portion, and a central bore through the end section and cylindrical portion,
      a rotor rotationally mounted to the carrier, and
      a stator fixedly mounted to the carrier, and
   at least one elastomeric damper at an interface between the carrier and the mounting structure for acoustically isolating the carrier assembly from the mounting structure, the mounting structure further comprising an annular bracket adjacent the base portion of the carrier and a shaft extending from the annular bracket and positioned within the central bore;

at least one magnetic storage disk rotated by the spindle motor;

at least one transducer for transferring information to and from the at least one magnetic storage disk; and an actuator assembly for positioning the at least one transducer with respect to the at least one magnetic storage disk.

13. A spindle motor for a disk drive, comprising:

a mounting structure for mounting the spindle motor within the disk drive, the mounting structure including a horizontal surface and a vertical surface perpendicular to the horizontal surface;

a carrier assembly, including:
   a carrier for mounting the carrier assembly to the mounting structure, the carrier including an inclined surface oblique with respect to the horizontal and vertical surfaces,
   a rotor rotationally mounted with respect to the carrier,
   a stator fixedly mounted to the carrier, and
   a hub rotationally mounted with respect to the carrier for supporting at least one storage disk of the disk drive; and at least one elastomeric damper at an interface between the inclined surface of the carrier and the horizontal and vertical surfaces of the mounting structure for supporting the carrier against the horizontal and vertical surfaces of the mounting structure and for preventing horizontal and vertical components of mechanical vibration from passing between the carrier and the mounting structure.

14. A spindle motor as recited in claim 13, wherein the at least one elastomeric damper comprises an O-ring.

15. A spindle motor as recited in claim 13, wherein the at least one elastomeric damper is formed of at least one of nitrile rubber and ethylene propylene diene monomer.

16. A spindle motor as recited in claim 13, the horizontal surface comprising a first horizontal surface, the vertical surface comprising a first vertical surface, and the inclined surface comprising a first inclined surface, the spindle motor further comprising:

a second horizontal surface on the mounting structure;

a second vertical surface on the mounting structure perpendicular to the second horizontal surface;

a second inclined surface oblique to the second horizontal and second vertical surfaces; and a second elastomeric damper at an interface between the second inclined surface of the carrier and the second horizontal and second vertical surfaces of the mounting structure for supporting the carrier against the second horizontal and second vertical surfaces of the mounting structure and for preventing horizontal and vertical components of mechanical vibration from passing between the carrier and the mounting structure.

17. A spindle motor as recited in claim 16, wherein the second elastomeric damper comprises an O-ring.

* * * * *